Patented Jan. 13, 1942

2,269,891

UNITED STATES PATENT OFFICE 2,269,891

INSECTICIDE AND FUNGICIDE

Charles Verne Bowen, Bethesda, Md., and Frederick E. Dearborn, Washington, D. C., assignors to Henry A. Wallace as Secretary of Agriculture of the United States of America, and to his successors in office No Drawing. Application July 2, 1940, Serial No. 343,561

2 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government of the United States for governmental purposes without the payment to us of any royalty thereon.

The object of this invention is to provide a material suitable primarily for use as an insecticide and fungicide, but which may also be used as a pigment or for preserving wood.

Another object is to provide an outlet for lactic acid a surplus dairy biproduct.

An attempt was made to utilize lactic acid in the production of compounds homologous to Paris green, but due to the solubility of copper lactate, no such compound was obtained. It was believed, however, that if a suitable radical or radicals could be introduced into the molecule of lactic acid, this difficulty could be overcome. Lactic acid has the following formula:

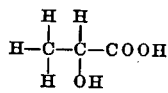

and is known as alpha-hydroxy propionic acid. The hydrogen atom in the alpha-hydroxy group (OH) or the entire alpha-hydroxy group may be replaced by R or R' respectively, and the solubility of the copper arsenite compound formed is such that a satisfactory product may be obtained, suitable for use as an insecticide, fungicide, wood preservator, or pigment. R and R' may be an alkyl, aryl, cycloalkyl, heterocyclic nucleus, or halogen, nitro, amino, alkoxy, or aryloxy group.

The derivative of lactic acid in which the benzoyl group has replaced the hydrogen atom of the alpha-hydroxy group, thus,

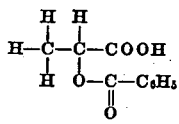

is known as O-benzoyl lactic acid. It is prepared by treating dry calcium lactate with benzoyl chloride at 110° C. for two hours.

We have found that this compound does form copper benzoyl lacto-arsenite, represented by the formula $3CuAs_2O_4.CuO.Y$ in which Y is the anhydride of O-benzoyl lactic acid. It is a homolog of Paris green and possesses insecticidal and fungicidal properties.

This material may be reduced to an impalpable powder by grinding and applied to vegetation either as a dust, alone or with an inert carrier, or made into a suspension and used as a spray. When applied as a spray it may be desirable to incorporate certain conditioners, such as, dispersing agents, wetting agents, stickers, and spreaders. The spray may be made by mechanically suspending the impalpable powder in the liquid medium.

The efficiency of copper benzoyl lacto-arsenite as an insecticide and fungicide is shown by the following experimental results:

1. When tested as a dust, this compound gave (a) a 100 percent kill of the 5th instar of the melon worm in 48 hours, (b) a 96 percent kill of the 5th instar of the Hawaiian beet web-worm in 48 hours, (c) a 100 percent kill of the 4th instar of the southern beet webworm in 48 hours, (d) a 100 percent kill of the 4th instar of the southern armyworm in 48 hours, (e) a 100 percent kill of the 2nd instar of the yellow bear in 48 hours, (f) a 100 percent kill of the 5th instar of the celery leaf tier in 48 hours (g) a 90 percent kill of the 4th instar of the diamond-back cabbage worm in 48 hours.

2. When tested as a spray against the codling moth larvae by the apple plug method, this compound gave 69.2 percent clean apples.

3. When tested as a fungicide, a saturated solution (118 parts per million) of this compound was toxic to *Sclerotinia fructicola* (brown peach rot) for at least eleven days.

It is recognized that this compound contains copper and arsenic, both of which have insecticidal action, but we have made from a dairy biproduct a new compound which has high efficiency as an insecticide and fungicide. The use of O-benzoyl lactic acid in this preparation is an outlet for a surplus commodity.

Having thus described our invention, what we claim for Letters Patent is:

We claim:

1. An insecticide containing as its essential active ingredient copper benzoyl lacto-arsenite.
2. A fungicide containing as its essential active ingredient copper benzoyl lacto-arsenite.

CHARLES VERNE BOWEN.
FREDERICK E. DEARBORN.